US008526409B2

(12) United States Patent
Chandranmenon et al.

(10) Patent No.: US 8,526,409 B2
(45) Date of Patent: Sep. 3, 2013

(54) MULTI-INTERFACE MOBILITY CLIENT

(75) Inventors: Girish P. Chandranmenon, Edison, NJ (US); Yui-Wah Lee, Matawan, NJ (US); Scott C. Miller, Monmouth, NJ (US); Luca Salgarelli, Hoboken, NJ (US); Salim Virani, Middlesex, NJ (US)

(73) Assignee: Alcatel Lucent, Paris (FR)

( * ) Notice: Subject to any disclaimer, the term of this patent is extended or adjusted under 35 U.S.C. 154(b) by 693 days.

(21) Appl. No.: 12/568,315

(22) Filed: Sep. 28, 2009

(65) Prior Publication Data

US 2010/0023763 A1 Jan. 28, 2010

Related U.S. Application Data

(62) Division of application No. 10/613,702, filed on Jul. 2, 2003, now Pat. No. 7,599,323.

(60) Provisional application No. 60/419,333, filed on Oct. 17, 2002.

(51) Int. Cl.
*H04W 4/00* (2009.01)
(52) U.S. Cl.
USPC .......................................................... 370/338
(58) Field of Classification Search
USPC .............. 455/432, 432.1, 418; 370/252, 338, 370/326, 321, 316, 332; 709/226, 223, 245, 709/249, 230
See application file for complete search history.

(56) References Cited

U.S. PATENT DOCUMENTS

| | | | |
|---|---|---|---|
| 6,317,028 B1 | 11/2001 | Valius | |
| 6,345,043 B1 | 2/2002 | Hsu | |
| 6,680,923 B1 | 1/2004 | Leon | |
| 6,801,777 B2 | 10/2004 | Rusch | |
| 6,879,587 B1 | 4/2005 | Yadav et al. | |
| 6,954,790 B2 | 10/2005 | Forslow | |
| 7,181,237 B2 | 2/2007 | Stockhusen | |
| 7,339,928 B2 | 3/2008 | Choyi et al. | |
| 2001/0048744 A1 | 12/2001 | Kimura | |
| 2002/0099854 A1* | 7/2002 | Jorgensen | 709/249 |
| 2002/0176366 A1 | 11/2002 | Ayyagari et al. | |
| 2002/0194385 A1 | 12/2002 | Linder et al. | |
| 2003/0065816 A1 | 4/2003 | Dharmadhikari et al. | |
| 2003/0069016 A1* | 4/2003 | Bahl et al. | 455/432 |
| 2003/0185233 A1 | 10/2003 | Ji et al. | |
| 2003/0202505 A1 | 10/2003 | Ozugur | |
| 2004/0009751 A1 | 1/2004 | Michaelis et al. | |
| 2004/0162109 A1 | 8/2004 | Shimoda et al. | |

OTHER PUBLICATIONS

Bhagwat, Pravin, Perkin, Charles, and Tripathi, Satish, "Network Layer Mobility: An Architecture and Survey," IEEE Personal Communications, 11 pages, Jun. 1996.

(Continued)

*Primary Examiner* — Kiet Doan
(74) *Attorney, Agent, or Firm* — Wall & Tong, LLP

(57) ABSTRACT

A mobile node comprises: a plurality of network interfaces, each with a respective device driver; a network layer; a multi-interface driver capable of communication with each network interface by way of the respective device driver for that network interface, the multi-interface driver handling communications from the network layer to any of the network interfaces; the multi-interface driver switching from a first one of the network interfaces to a second one of the network interfaces by changing the one of the plurality of network interfaces with which the multi-interface driver communicates, while hiding the switching from the network layer.

20 Claims, 9 Drawing Sheets

(56) References Cited

OTHER PUBLICATIONS

Braun, et al., "A Linux Implementation of a Differentiated Services Router," Institute of Computer Science and Mathematics, University of Berne, 12 pages, 2000.

Dornan, Andy, "CDMA and 3G Cellular Networks," www.networkmagazine.com/article/NMG.htm/2000831S006.html., 4 pages, visited Mar. 31, 2003.

Hayes, Vic., Chair IEEE P802.11 (Sep. 1990), Lucent Technologies, Tutorial on 802.11 to 802, doc.: IEEE P802.11-96/49A Rev. 1 to 49E, 70 pages, Mar. 1996.

© 1999 Microsoft Corporation, Microsoft Windows 2000 Server, Operating System, "Virtual Private Networking in Windows 2000: An Overview," White Paper, 24 pages.

C. Perkins, Editor, Network Working Group, Request for Comments: 2002, Category: Standards Track, "IP Mobility Support," IBM, www.ietf.org/rfc/rfc2002.txt.html, 32 pp. Oct. 1996.

* cited by examiner

| Type | Device | Priority | Ena |
|---|---|---|---|
| ethernet | Sierra Wireless AirCard 575 Adapter - P ... | 7 | ☐ |
| wavelan | Toshiba Wireless LAN Mini PCI Card - ... | 5 | ☑ |
| ethernet | Intel 8255x-based PCI Ethernet Adapter | 7 | ☑ |
| pstn | PPP-IOTA - Infrared Port | 1 | ☐ |
| pstn | - Quick 2 NetSM (14.4 kbps) - TOSHIBA ... | 1 | ☐ |
| pstn | SIERRA-IOTA - TOSHIBA Software Mod... | 1 | ☐ |
| pstn | verizon - TOSHIBA Software Modem AMR | 1 | ☐ |
| pstn | sarit - TOSHIBA Software Modem AMR | 1 | ☐ |
| pstn | - Express Network (1xRTT) - TOSHIBA ... | 1 | ☐ |
| 3g1x | - High Speed Data - Sierra Wireless Air ... | 3 | ☐ |
| 3g1x | WHey - Sierra Wireless AirCard 575 Mo... | 3 | ☐ |

402 — Type
404 — Device
406 — Priority
408 — Ena

Configure Interfaces

[Details] [Add] [Delete] [Auto Detect] [Save] [Cancel]

| NAI | Mobile Addr | HA Addr | Reg Life | R. Tun | MN-HA | MN-AA |
|---|---|---|---|---|---|---|
| salimv@lucent.com | 135.180.132.14 | 135.180.132.2 | 600's | ✓ | 1000 | Shared sec |
| girlshc@lucent.com | 135.180.132.7 | 135.180.132.2 | 300's | ✓ | 1000 | Shared sec |
| girlsh@ngn.lucent.com | 192.168.45.36 | 192.168.45.35 | 300's | ✓ | 1000 | Shared sec |
| test1@lucent.com | 135.180.240.50 | 135.180.240.60 | 3000's | ☐ | 1000 | Shared sec |
| teecy@lucent.com | 204.178.25.182 | 204.178.25.177 | 3000's | ✓ | 1000 | Shared sec |
| test2@lucent.com | 204.178.25.179 | 204.178.25.177 | 3000's | ✓ | 1000 | Shared sec |
| mip1@lucent.com | 10.1.3.196 | 10.1.3.180 | 3000's | ✓ | 1000 | Shared sec |

602, 604, Configure Profiles 606, 608, 610, 612, 614

[Details] [Add] [Delete] [Save] [Cancel]

(MIP)

800

900

MULTI-INTERFACE MOBILITY CLIENT

This application is a divisional of U.S. patent application Ser. No. 10/613,702, filed on Jul. 2, 2003, now U.S. Pat. No. 7,599,323 entitled MULTI-INTERFACE MOBILITY CLIENT, which application claims the benefit of U.S. Provisional Patent Application Ser. No. 60/419,333, filed Oct. 17, 2002; which prior applications are incorporated herein by reference in their entireties.

FIELD OF THE INVENTION

The present invention relates to communications generally, and more specifically to communications with mobile nodes.

BACKGROUND

Laptops and other mobile devices have created a desire for applications to operate seamlessly as the device moves from one network to another. E.g., a user who started her laptop on one network and started an email application, and later moved to another network should be able to continue her email session without any special operations. With the current simple Internet Protocol (IP) that is available on most operating systems a network interface is assigned a different IP address in each net network. This change of IP address will break existing application sessions. IETF has defined the Mobile IP (RFC3344) protocol to allow devices to keep their home IP address, even when the device changes its network association.

Mobile IP has been implemented only on devices with one network interface. Newer end user devices are equipped with multiple kind of wireless (e.g., 3G and 802.11) and wired (e.g., Ethernet) network interfaces. Since the availability of networks corresponding to these interfaces is variable, there is a desire for software that automatically manages these interfaces and provides seamless mobility to an application.

In these devices where there are multiple physical interfaces, there are two steps of mobility management. In step one, an interface is selected based on the physical characteristics of the network interface, and in step two, IP level (layer 3) associations are made over that selected physical interface. These steps are continuously executed, and the challenge to implementing the mobility client is to provide an illusion to the application that nothing has changed in the network. All applications, including VPNs, should continue under changing network conditions.

Several implementations of mobile IP manipulate routing tables to effect mobility. However, manipulating routing tables can cause disruptions to higher layer protocols and applications. In fact, such solutions will not work in conjunction with other applications such as IPSec clients that manipulate routing tables themselves.

SUMMARY OF THE INVENTION

In some embodiments, a mobile node comprises: a plurality of network interfaces, each with a respective device driver; a network layer; a multi-interface driver capable of communication with each network interface by way of the respective device driver for that network interface, the multi-interface driver handling communications from the network layer to any of the network interfaces; the multi-interface driver switching from a first one of the network interfaces to a second one of the network interfaces by changing the one of the plurality of network interfaces with which the multi-interface driver communicates, while hiding the switching from the network layer.

In some embodiments, a mobile node includes at least two available wireless interface drivers having respectively different interface types for communications by the mobile node. An interface detector determines a plurality of characteristics of each of the interface types. A selector selects one of the interface types based on the plurality of characteristics. The mobile node communicates by way of an interface having the selected interface type.

In some embodiments, a method of operating a mobile node having an IPSec layer includes the steps of: establishing an IPSec session between the mobile node and a virtual private network (VPN)/IPSec gateway by way of a first network, switching from the first network to a second network without disturbing the IPSec session, the switching being effected using mobile IP at a lower layer than the IPSec layer, and hiding the switching from the IPSec layer by providing a fake MAC layer address of a default router to the IPsec layer and rewriting MAC layer headers in incoming and outgoing packets in an intermediate driver with correct MAC layer addresses.

In some embodiments, a method is provided for selecting a Wi-Fi network from a plurality of Wi-Fi networks. Each Wi-Fi network has an associated ESSID. An input is received indicating a selection of a complete ESSID, an ESSID prefix, or a request for any available Wi-Fi network. A network is automatically selected. The Wi-Fi network associated with the complete ESSID is selected, if the input indicates the complete ESSID. One of the Wi-Fi networks associated with an ESSID having the ESSID prefix is selected, if the input indicates selection of the ESSID prefix. One of the available Wi-Fi networks is selected if the input indicates a request for any available Wi-Fi network. The automatic selecting step is based on at least one of the group consisting of signal strength in each Wi-Fi network, priority of each Wi-Fi network, number of clients in each Wi-Fi network, and frame error rate in each Wi-Fi network, if the input indicates selection of the ESSID prefix or any available Wi-Fi network.

BRIEF DESCRIPTION OF THE DRAWINGS

The following detailed description of preferred embodiments of the present invention will be better understood when read in conjunction with the appended drawing. For the purpose of illustrating the present invention, there are shown the drawing embodiment which is presently preferred. however, the present invention is not limited to the precise arrangements and instrumentality shown. In the drawing:

FIG. 4 is a diagram of an interface configuration screen of the graphical user interface shown in FIG. 2.

FIG. 6 is a diagram of a profile configuration screen of the graphical user interface shown in FIG. 2.

DETAILED DESCRIPTION

U.S. Provisional Patent Application No. 60/419,333, filed Oct. 17, 2002, is incorporated by reference herein, as though set forth in its entirety.

Figure 1:
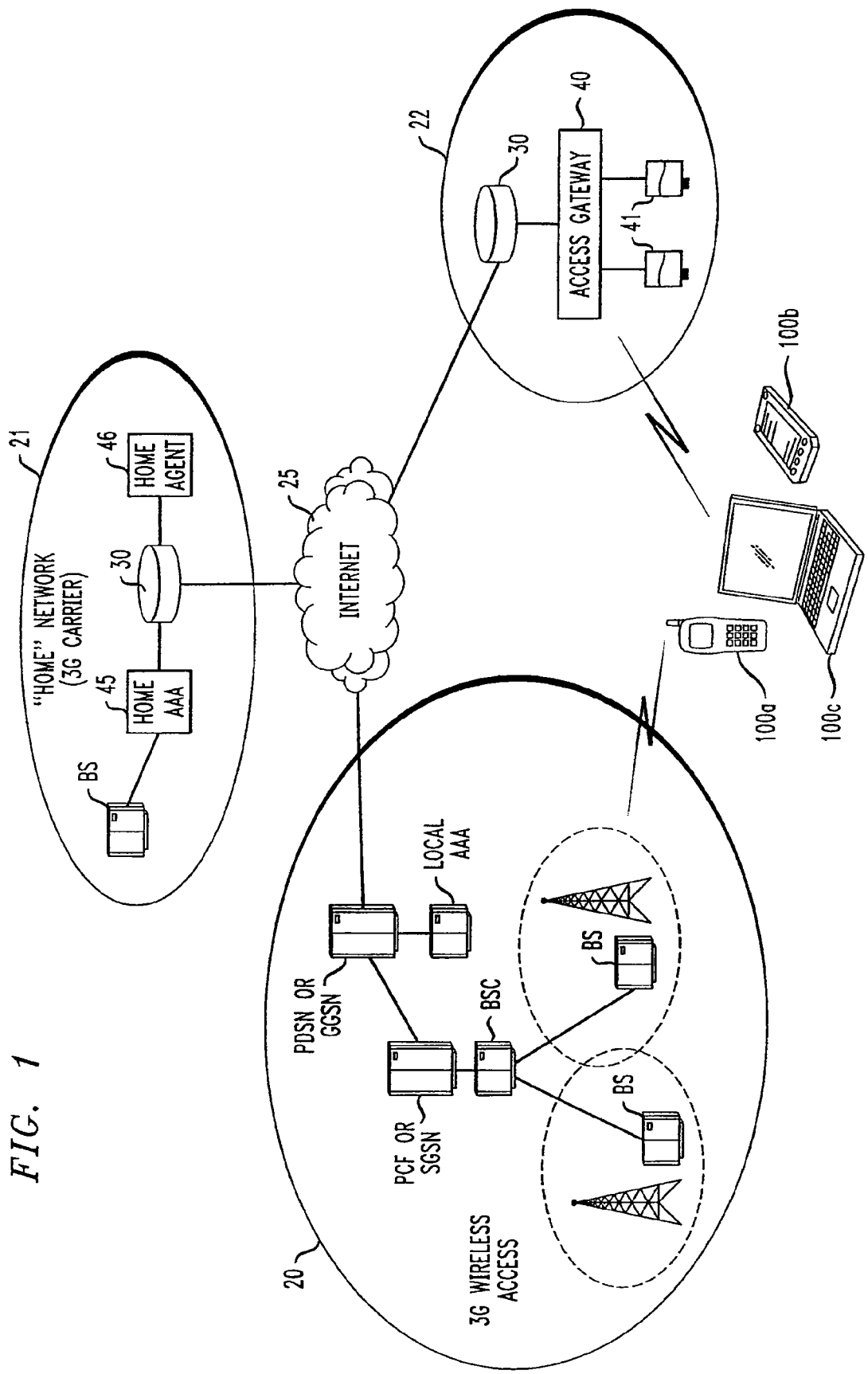
FIG. 1 is a block diagram showing a network where the multi-interface mobility client of the present invention may be used.

FIG. 1 shows a system having a plurality of mobile nodes 100*a*-100*c* that are capable of moving among various network domains 20-22. The drawing shows a wireless telephone 100*a*, a wireless personal digital assistant 100*b*, and a wireless laptop 100*c*. These are only examples, and are not intended to limit the types of mobile nodes that may be used. These and other mobile nodes are generally referred to herein by reference numeral 100.

Domains 20-22 are examples of domains that may be visited by mobile nodes 100. Domain 20 includes a packet data serving node (PDSN) or gateway GPRS support node (where GPRS is general packet radio service) coupled to the Internet 25. A packet control function (PCF) or serving GPRS support node is coupled to the PDSN or CGSN. A base station controller (BSC) is coupled to the PCF/SGSN. A local authentication, authorization and accounting (AAA) server controls what computer resources users have access to and keeps track of the activity of users over the network. A plurality of base stations BS are coupled to the BSC.

A home domain 21 (which may use, for example, third generation (3G) wireless technology or other wireless technology) includes a router 30 coupled to the Internet 25, a home AAA server 45 and a home agent 46.

An 802.11 domain 22 includes a router 30 coupled to the Internet 25 and an access gateway 40. The access gateway 40 has a plurality of 802.11 access points (AP) 41 connected thereto.

Figure 2:
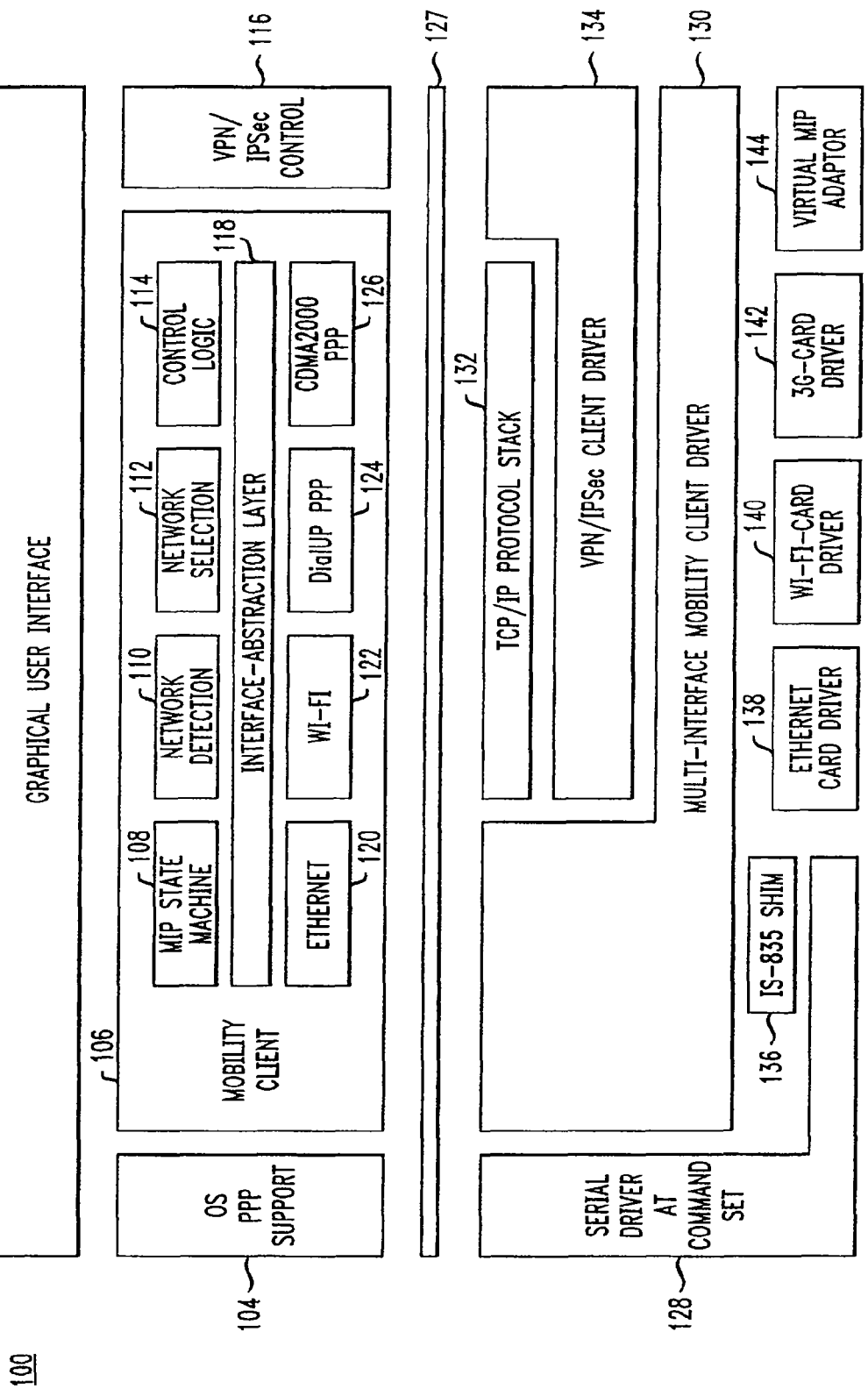
FIG. 2 is a block diagram showing the architecture of an exemplary mobile node.

FIG. 2 shows a possible software architecture of a multi-interface mobility client 100, which may provided in any of the above mentioned types of mobile nodes. The multi-interface mobility client 100, which may be provided, selects a physical interface based on the objective physical characteristics of the interface, such as signal strength and/or bandwidth and subjective characteristics, such as a user preference. Once a physical interface is selected, client 100 uses mobile IP to maintain the illusion of being at the home network (e.g., 3G network 21). Intelligent selection algorithms (described below) are employed, and the interface selection and mobile IP registrations are implemented in such a way that there is always network connectivity over one of the interfaces. This type of implementation can provide zero packet loss in some situations involving overlapping network coverage. The implementation of mobile IP over multiple interfaces without manipulating the routing tables allows co-existence with other applications such as virtual private network (VPN) clients that modify the routing tables.

In a preferred embodiment of the invention, the Multi-interface Mobility Client performs one or more the following functions:

It provides seamless mobility across a variety of interfaces, such as Ethernet, Wavelan (802.11b), and 3G1x-RTT.

It achieves seamless mobility using mobile IP implementation conforming to IETF standards.

Its intelligent interface selection algorithm prevents bouncing between networks, and provides zero loss switching from one interface to another in overlapping coverage situations.

It also makes intelligent selection among the several available 802.11 networks, based on a preference list, for example, given by a user, and/or the signal strength of the 802.11 network.

Its modular design allows easy addition of new interfaces. In one embodiment, the software handles: Sierra 3G1X card, IS707 compliant 3G handset, Ethernet, point-to-point protocol (PPP), 802.11 interfaces.

Its design has one component (multi-interface mobility client driver 130) inside the kernel, that masks the specifics of the physical interfaces 138, 140, 142, 144 from the upper layer protocols 132, enables it to work with third party IPSec clients 116, and helps in providing IPSec over mobile IP.

In greater detail, one embodiment of the mobile node 100 includes the following components shown in FIG. 2. In FIG. 2, the blocks 102-126 above line 127 are applications, and the blocks 128-144 below the line 127 run inside the operating system kernel.

An easy-to-use GUI 102 allows a user to configure the networks he or she wants to allow roaming between, as well as provides 802.11 specific configuration information such as wired equivalent privacy (WEP) keys, extended service set identifiers (ESSIDs), etc. In addition, the GUI 102 allows the user to override the automatic interface selection and manually select an interface. The GUI 102 is described in greater detail with reference to FIGS. 4-6, below.

The client 100 also implements a specialized PPP support layer 136 that enforces the PPP behavior as specified for a handshake with a PDSN in the 3G wireless network. Default PPP drivers 128 (e.g., as included with the Windows operating system) do not behave according to the specification.

A mobility client function application 106 is provided. This function includes nine components:

A mobile IP state machine 108 complies with the IETF mobile IP standard, RFC 3344.

A network detection block 110 determines the types of networks for which a signal is currently being received. The exemplary network detection block 110 periodically polls the various interfaces for which the client 100 is configured. In some embodiments, the polling cycle time can be configured by the user. For example, polling intervals between 180 and 1000 milliseconds may be used. Other polling cycle times, larger or smaller, may also be used. One of ordinary skill will understand that the polling cycle time should be short enough to allow the client 106 to detect loss in signal strength from the current interface and switch to another available interface before service is degraded.

Network detection block 110 provides its outputs to both the network selection block 112 and GUI 102, which displays the status of each interface for the user.

The network selection block 112 receives the physical interface characteristics from the network detection block 110 and subjective interface characteristics entered by way of the GUI 102 for the currently available interfaces. Network selection block 112 uses a weighting algorithm (described below) to select one of the currently available interfaces.

The control logic block 114 controls execution of the loop of running through the state machine, checking for interface detection, and interface selection. Control logic also implements standard mobile IP functions. When the mobile node 100 comes to a new network, the control logic first tries to detect a foreign agent that is in the system, by sending out a message called a solicitation and the foreign agent is expected to respond to the mobile node. Once the foreign agent responds with an advertisement and the state machine receives that advertisement, the mobile node goes out and registers with the foreign agent. The foreign agent forwards the registration packet to the home agent, and when a successful reply from the home agent is received by the mobile node, via the foreign agent, the connection is set up for the mobile node to be present in a new network and receive data that was sent to the mobile node by way of its home network.

The interface abstraction layer 118 hides the operating system specific features of the underlying operating system from mobile IP (MIP) state machine 108, network detection 110, network selection 112, control logic 114 and GUI 102. Thus, blocks 108, 110, 112, 114 and 102 can be developed as portable software, independent of the operating system, and can be shielded from changes in the underlying operating system.

Below the abstraction layer 118, the Ethernet block 120, wireless fidelity (Wi Fi) block 122, dial up PPP block 124 and CDMA2000 PPP block 126 are stubs that enable the interface abstraction layer 118 to communicate seamlessly with a variety of interfaces. Depending on the type of operating system on which mobility client 106 is running, blocks 120, 122, 124 and 126 use the specific system calls to bring up an interface, bring down an interface, get the signal strength, and the like. Abstraction layer 118 is the common layer that stays for a variety of operating systems. To port the mobility client to a different operating system, the Ethernet 120, WI-FI 122, dial up PPP 124 and CDMA2000 126 stubs would be rewritten to actually use the corresponding system calls for the new operating system.

VPN/IPSec control block 116 may be, for example, the VPN gateway and IPSec client product, from Lucent Technologies of Murray Hill, N.J. Other VPN client software may be used, so long as it is able to authenticate to the VPN gateway.

The multi interface mobility client driver 130 provides functionality to the upper layer 106 above line 127, as indicated by the left portion of block 130 that comes all the way up to line 127. In particular, the identification of the selected interface is sent from network selection block 112 to multi-interface mobility client driver 130. Multi-interface mobility client driver 130 also intercepts incoming and outgoing packets to and from the TCP/IP protocol stack 132, as indicated by the right side of driver 130, which is beneath TCP/IP 132.

The network selection block 112 tells the mobility client driver 130 the current interface driver that is desired to be used. The client driver 130 intercepts the packet from TCP/IP 132 and sends it to the correct interface 136, 138, 140, 142. For a computer running the Windows operating system, the TCP/IP protocol stack 132, the PPP driver 128, Ethernet driver 138, Wi Fi driver 140 and 3G driver 142 are all included. In the absence of multi interface mobility client driver 130, TCP/IP 132 would select an interface and then decide where to send the data packet based on routing tables and whatever information that the operating system has available.

In the embodiment of FIG. 2, the TCP/IP selection of an interface is overridden. A new virtual MIP adapter 144 is added. The TCP/IP stack 132 selects virtual MIP adapter 144 as its primary interface. Now, any packet that is sent from the TCP/IP stack 132 to any of the adapters 136, 138, 140 or 142 is intercepted by multi-interface mobility client driver 130, which decides to send the packet to the corresponding one of the interfaces 136, 138, 140 or 142 that the network selection algorithm in block 112 tells driver 130 to use.

When the TCP/IP stack 132 is delivering packets, those packets are intercepted by the multi-interface mobility client driver 130. Based on the instruction from the network selection block 112, driver 130 will use that selected interface 136, 138, 140 or 142 to send packets out. It will also do any additional encapsulation and decapsulation needed (e.g., encapsulation for mobile IP tunnels).

An advantage of having the multi-interface mobility client driver 130, is improved interface continuity. For example, assume the mobile node is attached to Wi-Fi. If the Wi-Fi interface went down in a client without the multi-interface mobility client driver 130, the TCP connection breaks. However, with the multi-interface mobility client driver 130 intercepting everything in between the TCP/IP stack 132 and the Wi-Fi driver 140, if Wi-Fi goes down, the TCP/IP protocol stack 132 never becomes aware of the change. Network Detection 110 detects that Wi-Fi is lost, and detects the other interfaces that are currently available. Network selection 112 selects a new interface, and notifies the multi-interface mobility client driver 130. The multi-interface mobility client driver 130 changes to either Ethernet driver 138 or 3G driver 142. Meanwhile, the TCP/IP stack 132 believes that it is continuously connected by way of the virtual MIP adaptor 144 the entire time.

The role of the virtual MIP adaptor 144 is to provide a dummy interface which is continuously and always available to TCP/IP protocol stack 132, for exchange of status information. It is a piece of software that mimics a driver, and looks like an interface driver to TCP/IP 132. It has no major functionality except to constantly provide an interface so that TCP can always communicate with it. The source address for outgoing packets is determined by the address of the virtual MIP adaptor 144, and provided to the TCP/IP stack 132 for outgoing packets. Although packets from TCP/IP stack 132 are addressed to the virtual MIP adaptor 144, the packets are intercepted by the multi-interface mobility client driver 130 and redirected to the correct outgoing physical interface.

The IS 835 shim block 136 is provided for 3G support. In the 3G world, the IS 835 standard specifies the way PPP functions with respect to the TCP connection. There is link control protocol followed by IP control protocol. These are handshakes in standard PPP. Link control protocol tries to connect between the two end points for the actual physical layer link. If the physical layer link is 3G wireless, link control protocol has its own handshake. This is followed by is IP control protocol (IPCP), which actually assigns IP addresses to both ends. IS-835 expects a mobile IP node to reject the IPCP negotiation. That is, IPCP should not be used. However, a standard Windows PPP stack includes IPCP, and there is no way to disable it. The IS 835 shim block 136 intercepts all PPP control protocols for Mobile IP through a PDSN and then rejects PPP if present. The IS 835 shim block 136 is not used for a WI-FI, or for another serial line PPP for example.

In a preferred embodiment, the operation of the system is as follows: Once, the client is installed, the client GUI 102 allows the user to create a profile, containing a login/network access identifier, the mobile node's home IP address, and its home agent's IP address, security associations between the mobile node the home agent. It also allows the user to pick a subset from the available network interfaces to be used for roaming, and assigns them priorities. As the client is started up, and the user is logged in, the system brings up all the selected interfaces. From then on, it continuously selects an interface based on the user assigned priority, the signal strength of the network, and the availability of a mobility agent (such as a foreign agent) on the network; to use as the current interface. Once the interface is selected, the mobile IP protocol implementation sends out a solicitation message on that network to locate a foreign agent on that network. If the foreign agent is available, its registers itself with the home agent, through that foreign agent. Once the registration is complete, the driver layer is notified of the change in the current interface, and from then on the driver forwards all the outgoing traffic through the selected physical interface.

Figure 3:
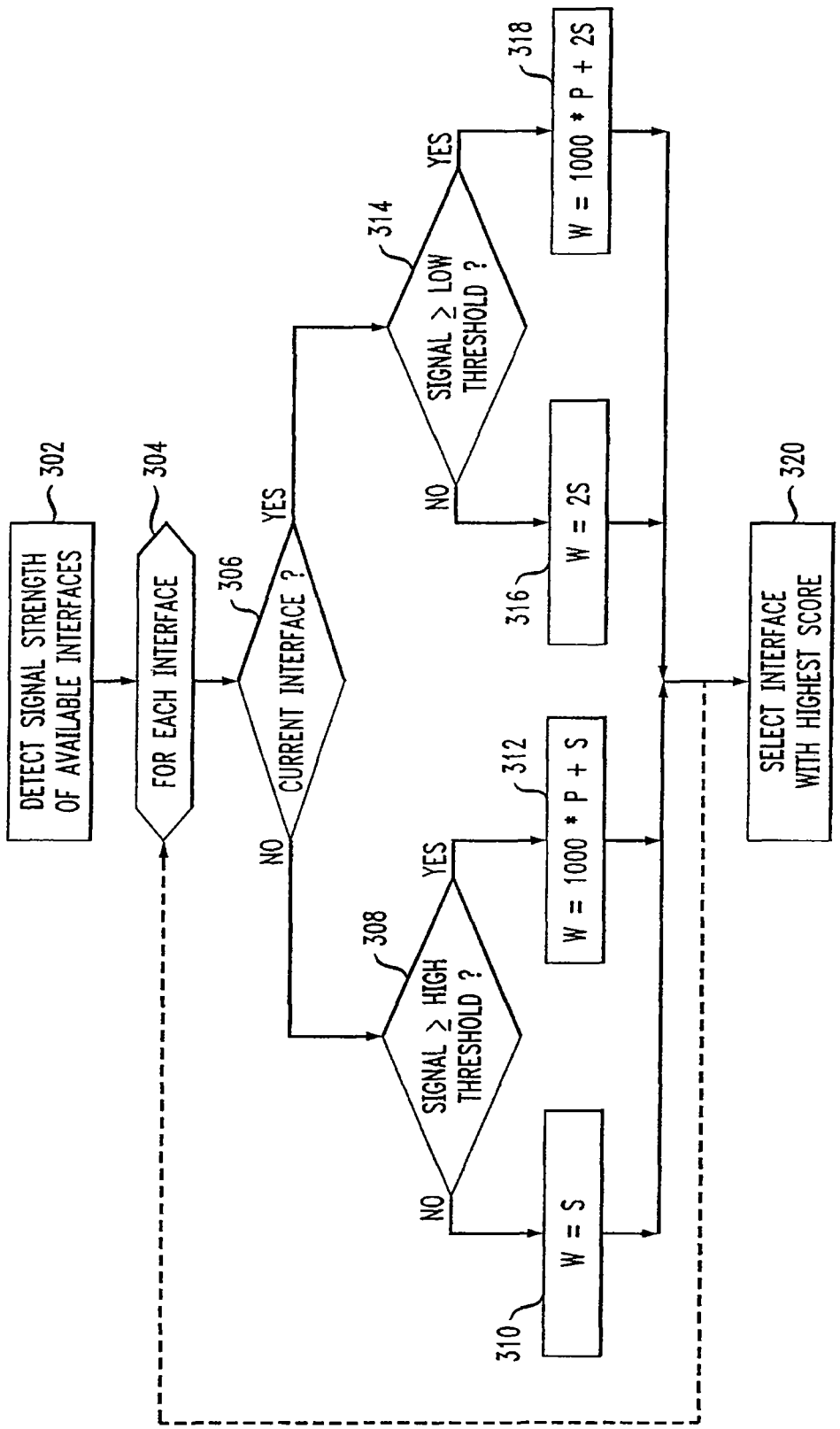
FIG. 3 is a flow chart of an exemplary interface selection algorithm.

FIG. 3 is a flow chart of the interface selection algorithm used by network selection block 112. This algorithm effectively minimizes network bounce, while taking into account the user assigned priorities. These are often conflicting requirements, for example, a user may have a high priority assigned to an interface that has very low signal strength. In addition, when the signal strengths are comparable, especially at network boundaries, there is a chance of bouncing between networks, if the algorithm is poorly designed.

The interface selection algorithm preferably works as follows: Each interface has an assigned priority p (for example, between 0 and 7), and a measured normalized signal strength s ($0 \leq s \leq 100$). The priority is a user defined value that reflects the user's subjective preference for a particular interface relative to other interfaces. The signal strength is scaled so that 0 is the signal strength at which a connection would be lost, and 100 is the signal strength immediately adjacent to the access point. The algorithm also maintains two threshold values, L (a low threshold) and H (a high threshold). The algorithm preferably calculates the score W of each interface based on the following formula:

For the current interface in use, its score $$w=1000*p+2s \text{ if } s \geq L$$

and w=2s if s<L
If this is not the current interface, its score $$w=1000*p+s \text{ if } s \geq H$$

and w=s if s<H.
The algorithm selects the interface with the highest score. Referring now to FIG. 3, the algorithm is shown. At step 302, the network detection block 110 detects which interfaces are currently available, and the signal strength of each interface. This information is provided to network selection block 112 and GUI 102.

At step 304, a loop including steps 306-314 is executed for each available interface.

At step 306, a determination is made whether the interface for which the score is being calculated is the current interface.

At step 308, if the score is being calculated for any interface except the current interface, the signal strength is compared to the high threshold H.

At step 310, if the signal strength is below H, then the score is given by W=s.

At step 312, if the signal strength is greater than or equal to H, the score is given by W=1000p+s.

At step 314, if the score is being calculated for the current interface, a determination is made whether the signal strength is greater than or equal to the low threshold L.

At step 316, if the signal strength is below L, then the score is given by W=2s.

At step 318, if the signal strength is greater than or equal to L, the score is given by W=10000p+2s.

When the loop is completed for every currently available interface, step 320 is executed. At step 320, the interface with the highest score is selected.

The exemplary algorithm of FIG. 3, can be explained in two ways. From the point of view of signal strengths, the score is calculated by applying a higher weight coefficient to the signal strength of the current interface connection than a weight coefficient applied to the signal strength of any other available interface. Thus, the network selection block 112 switches to a new interface only when the newer one has about two or more times the signal strength compared to the current interface. From the point of view of the priority values, a weight coefficient applied to the user priority value for each interface depends on the signal strength for each interface. That is, a weight coefficient of zero is applied to the user priority value (or the priority value is simply excluded from the score) for each interface having a signal strength below a respective threshold value for that interface. Thus, the network selection block 112 switches to a new interface if the new interface has two or more times the signal strength of the current interface. (Once the priorities have zero weight, they don't affect the selection. The formula for the score, combines these two approaches and the low and high thresholds to compute a metric that determines the interface selection.

In order to avoid bouncing between networks due to occasional sudden drops in signal strength, a hysteresis mechanism is preferably provided to average a configurable number of samples in calculating the normalized signal strength. For any given interface and given signal strength, the score is higher when the given interface has the given signal strength while the given interface is currently being used by the mobile node. The threshold value L (for including the priority in the score calculation) for the current interface connection is lower than the threshold value H for other interfaces not currently in use. Thus, once a connection is established using a current interface, the interface is not changed until there is either a significant decline in the signal strength of the current interface or a significant increase in the signal strength of a new interface, or both.

Looked at another way, in the range where the signal strength s>high threshold H, if x is the current interface, x will only yield to another interface y with a higher priority and/or a signal strength twice that of x.

In the range between low threshold L and high threshold H, if x is the current interface, x will only yield to another interface y with a higher priority and/or a signal strength twice that of x. On the other hand, if x is not the current interface, it may yield to another interface y even when y has a lower priority.

In the range where signal strength is below L, an interface x yields to another y only based on its signal strength. Once x is the current interface, it yields to another interface y, only if y has signal strength twice that of x.

In the exemplary embodiment, the user priority values range between one and the number of interfaces. For example, for a mobile node with four network interfaces, the user priority varies from one to four. Thus, given a signal strength coefficient of one or two, a signal strength ranging between 0 and 100, a user priority coefficient of 1000 and a user priority value between one and the number of interfaces, the user priority has a much greater impact on interface selection than the signal strength, so long as the signal is above its respective threshold.

Given these specific coefficients, the effect of the algorithm is as follows: If the signal strength for all interfaces is less than L, then signal strength solely determines selection. If the signal strength for any of the interfaces is greater than or equal to the respective threshold for that interface (L for the current interface, H for new interfaces), then the selection is determined by the interface having the highest priority among the interfaces having a signal strength of at least the respective threshold of that interface. That is, so long as at least one interface has a signal strength greater than or equal to the appropriate threshold, the interface having the highest user priority among those interfaces with signal strength higher than the threshold is selected (unless there is a tie between two or more interfaces with the same highest priority, in which case signal strength is the tie breaker). This high weighting takes into account the fact that the user has much more information about other advantages of each interface besides the signals strength. The user may be more interested in cost, for example. Thus, the exemplary embodiment gives the user's priority much higher weight than the signal strength.

One of ordinary skill can readily tune the exemplary algorithm. The impact of signal strength on interface selection (relative to the impact of user preference) can be adjusted by varying the weight coefficient applied to the signal strength and/or the weight coefficient applied to the user priority in the score calculation. Similarly, to achieve different effects, the range of the user preference can be adjusted (e.g., instead of varying from 1 to the number of interfaces, it can vary from 0-100, or 0-1000), while keeping the coefficients the same. Another way of changing the relative importance of signal strength and priority is to adjust the range of the signal strength (e.g., from 0-100 to 0-1000) while keeping the coefficients the same.

Note that in the exemplary algorithm of FIG. 3, both signal strength s and priority p are taken into account, so that a new interface may be adopted having less than twice the signal strength of the current interface (if the priority is very high relative to the current interface) or lower priority than the current interface (if the signal strength is significantly more than two times that of the current interface).

Various mechanisms may be used to track a stable signal strength. For example, averaging 'N' samples of signal strength measurements, dropping the zero value between two high non-zero values, and/or calculating the slope of the measured signal strength (based on past two values) and predicting a trend for the next interval. Other methods of sampling and averaging the signal strength measurements may be used.

In a variation of the above example, the logic of the algorithm may be varied. For example, if s>H, then a new interface may only be adopted if the user preference is greater AND the signal strength is more than twice the current signal strength; if L<s<H, a new interface may only be adopted if the user preference is greater AND the signal strength is more than twice the current signal strength. By requiring both conditions (higher priority and higher signal strength) to be simultaneously satisfied, this variation provides additional resistance to bouncing between interfaces.

In other variations, the bandwidth of the interface is taken into account by the interface selection algorithm. In some embodiments, all score calculation may include terms for signal strength, bandwidth and user priority. In other embodiments, a bandwidth term may only be included if the signal strength is greater than the low threshold L (for the current interface) or greater than the high threshold H (for any other interface). In further embodiments, the bandwidth can be used as a proxy for user preference, or as default measure of user preference, which the user is free to change. When bandwidth is used in the score calculation, static bandwidth may be used, due to the difficulty in measuring the precise dynamic bandwidth at any moment.

Although the operation of the mobile node is described above with reference to an example in which the mobile node switches from one network interface to another network interface, the exemplary mobile node can also maintain an upper layer connection when the mobile moves from one network to another (i.e., different ESSIDs) using the same physical interface in the mobile node. The exemplary switching algorithm controls such cases as well, by monitoring the signal strengths of all ESSIDs available, and switching to one based on signal strength, priority, and the like, using the same criteria as described above. The user input module (described below) allows the user to independently assign priorities to a plurality of networks that are accessed using the same network interface in the mobile node.

For example, if the user is aware of a first 802.11 AP that is free, and a second 802.11 AP that charges an hourly connection fee, the user can assign a higher priority to the first 802.11 AP, even though the communications path for both use the same network interface in the mobile node.

Another feature of the exemplary mobile node is the ability to maintain seamless sessions above the network layer (such as email or other application layer connection, or TCP or other transport layer connection) during a handoff. In some embodiments, the mobile node is able to maintain IPSec sessions so that a user that is logged into his/her enterprise network is able to move from one network to another, without having to reestablish the VPN session. This seamless handoff can be achieved because the multi-interface driver 130 is layered below all other intermediate drivers (such as IPsec driver 134) in the operating system.

For example, an IPSec session is established between the mobile node 100*c* and the VPN/IPSec gateway by way of a first network 20. The mobile node switches from the first network 20 to a second network 22 without disturbing the IPSec session. The switching is effected using mobile IP at a lower layer than the IPSec layer 134. The intermediate driver 130 hides the switching from the IPSec layer 134 by providing a fake MAC layer address of a default router to the IPsec layer, and rewriting MAC layer headers in incoming and outgoing packets with correct MAC layer addresses.

FIG. 4 is a diagram showing an exemplary interface configuration screen for GUI 102. The exemplary screen 400 includes a table with a row for each interface device. Each row includes a type 402, a device name 404, a user defined preference or priority, and an enable checkbox 408, which allows the user to enable or disable any desired interface.

Figure 5:
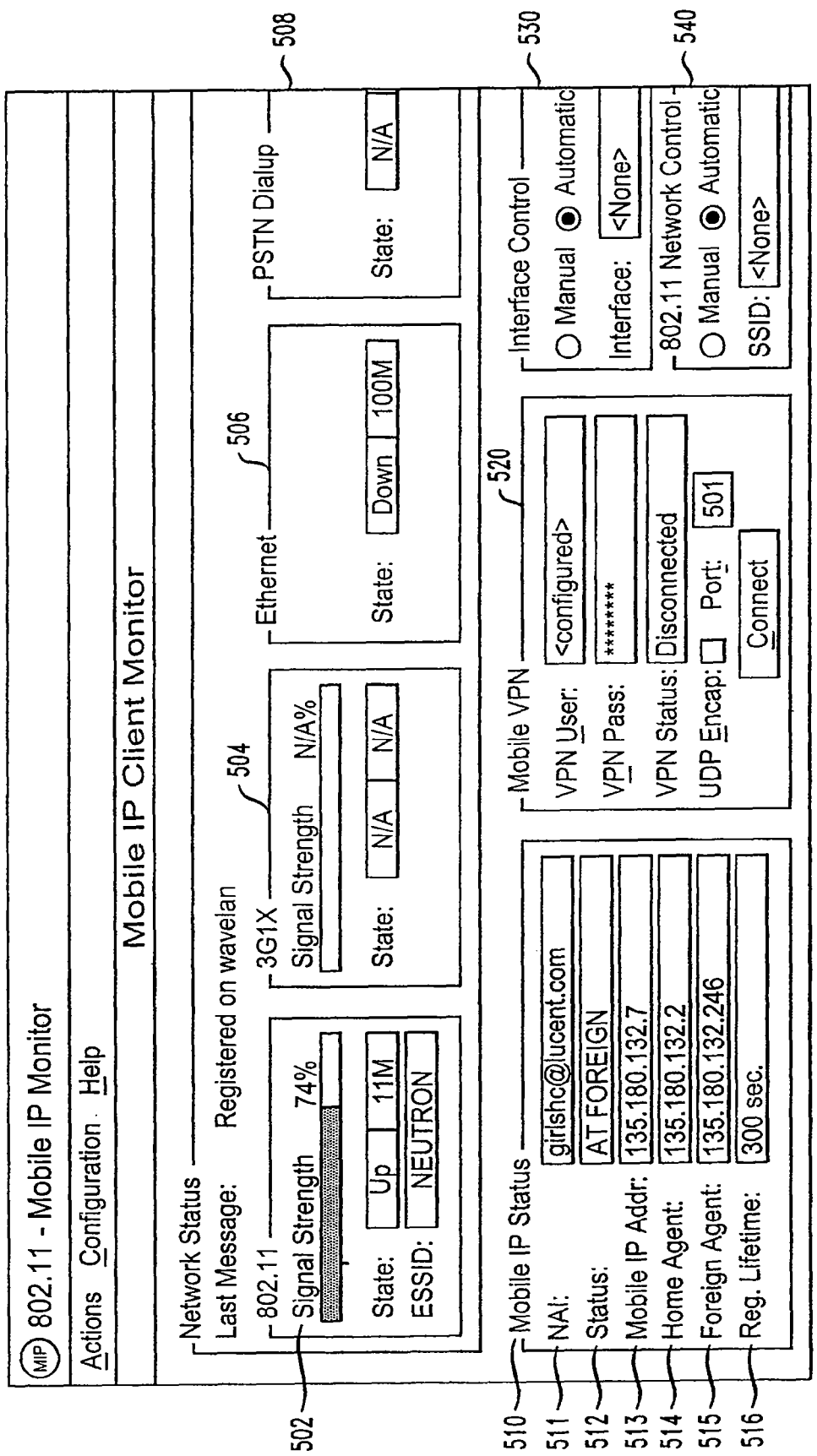
FIG. 5 is a diagram of a monitor screen of the graphical user interface shown in FIG. 2.

FIG. 5 is an exemplary interface monitor screen 500 for GUI 102. The monitor screen 500 includes a respective status field, including 802.11 (Wi-Fi) status 502, 3G status 504, Ethernet status 506 and public switched telephone network (PSTN) dialup status 508. The 802.11 status 502 includes signal strength, status, and ESSID. The 3G status 504 includes signal strength and state. The Ethernet status 506 and PSTN dialup 508 each include the state.

A separate region 510 displays mobile IP status data, including network access identifier 511, status 512, mobile IP address 513, home agent 514, foreign agent 515 and registration (lease) lifetime 516.

A mobile VPN status field 520 displays whether VPN is connected, whether UDP encapsulation is used, and the port. This field also allows the input of a user and password for establishing the VPN session.

An interface control field 530 is provided. This field allows the user to specify automatic interface selection, or to override the automatic selection and manually select an interface.

An 802.11 network control field 540 is provided. This allows the user to select a service set identifier (SSID) manually, or allow automatic selection.

GUI 102 can also integrate the state of the third party IPSec client into the display. The GUI configuration options allow the user to pick which of the current network interfaces to use for mobility, assign priorities for each interface, select the kind of authentication keys and algorithms to use between itself and home agent, configure the lifetime values for the Mobile IP registration, and/or configure the WaveLan networks that the client is allowed to use (including their WEP keys and signal strength low threshold that make sense to the network).

Implementing machines with multiple network interfaces poses new challenges, such as interface selection. The exemplary algorithm for intelligent interface selection takes into account the user defined priorities as well as the physical characteristics of the network interface, such as signal strength. It also minimizes the network bounce that one may experience in the network coverage boundaries.

The exemplary embodiment introduces a driver 130 that stays below all other network protocols and just above the physical devise drivers 136, 138, 140 and 142, providing the illusion to the higher layers that there is only one network interface. The driver 130 internally redirects the traffic to the appropriate physical device, based on interface selection.

The exemplary client 106 starts the selection and activation of the new interface, even before the current interface loses its signal completely. This enables providing substantially zero packet loss during switching, whenever there is overlapping network coverage.

FIG. 6 shows another screen of GUI 102, which allows the creation and management of user profiles. Screen 600 displays a summary of each profile, including items such as:

User name/login/network access identifier (NAI) 602.

A shared key or certificate used for authenticating the user or a pointer to where this information is stored (not shown)

For mobile IP support, mobile IP configuration parameters such as mobile address 604, Home Agent address 612, Home Address 606, registration lifetime 608, authenticator information 614, and the like. In the example, a checkbox 610 is provided for each user, to enable or disable reverse tunneling. If reverse tunneling is enabled, and the client is in colocated mode, all packets are encapsulated from the client and sent to the Home Agent. If the client is not in colocated mode, the packets are encapsulated from the Foreign Agent to the Home Agent. If reverse tunneling is disabled, the packets to a corresponding node (e.g., a web server) do not have to go through the Home agent. They are sent directly; and only those that are sent from the corresponding node are encapsulated at the Home agent and sent to the mobile node via the Foreign Agent.

Figure 7:
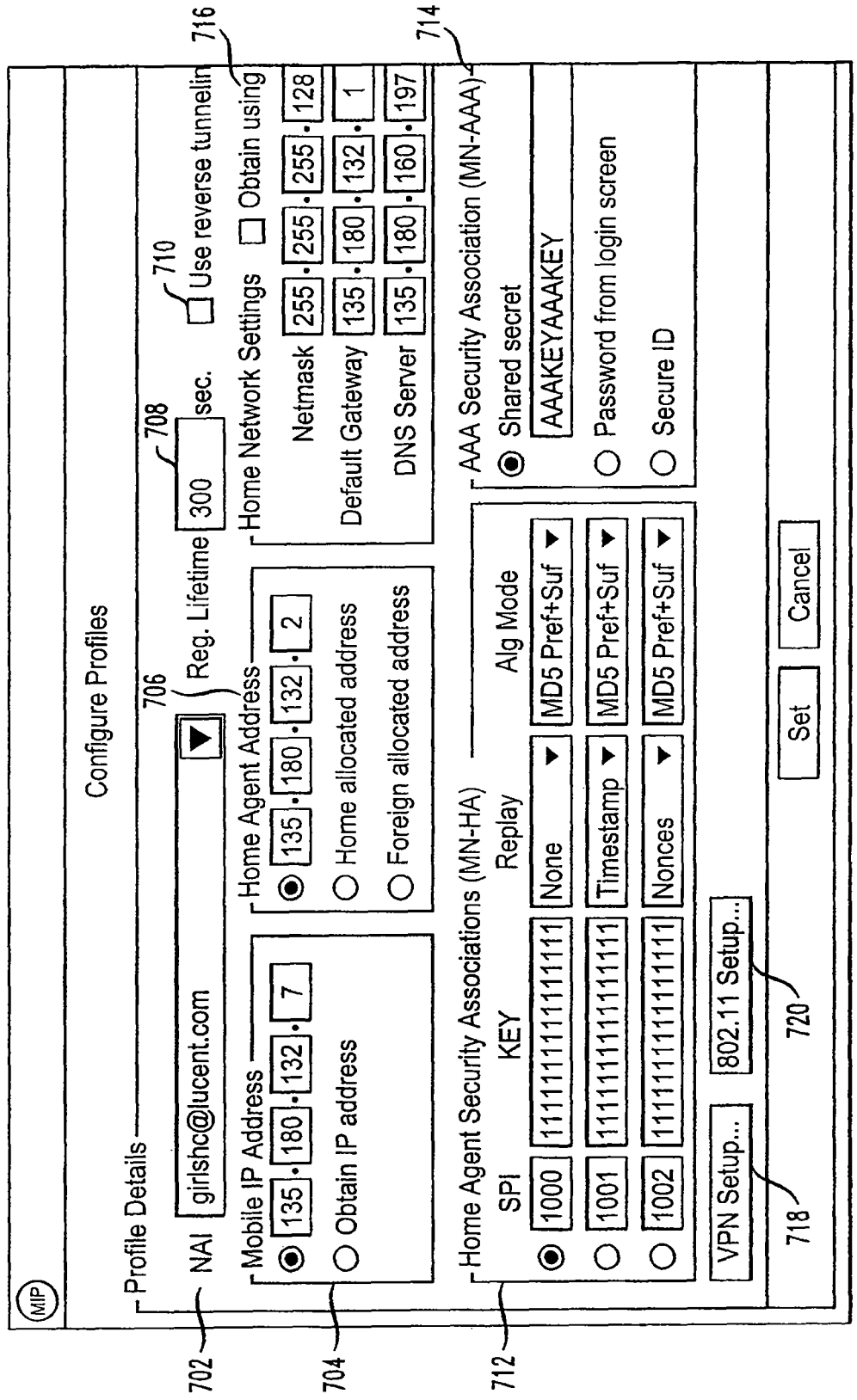
FIG. 7 is a diagram of a profile configuration screen of the graphical user interface shown in FIG. 2.

When the user double-clicks on one of the rows of the "Configure Profiles" screen, a configuration screen 700 for that NAI appears, as shown in FIG. 7.

FIG. 7 shows the input screen 700 used to configure the profiles. Each input field in FIG. 7 corresponds to a respective column of the summary screen 600 (FIG. 6).

The NAI field 702 displays the NAI of the user currently being configured. Another NAI can be configured using the drop down box.

The mobile IP address input field 704 allows the user to enter an address, or to request that an IP address be obtained. If the an address is to be obtained, a standard procedure using DHCP protocol may be followed.

The home agent address field 706 allows the user to enter the address or specify a home allocated address or foreign allocated address.

The registration lifetime is input in field 708.

Reverse tunneling is enabled or disabled using checkbox 710.

The home agent security associations field 712 allows input of keys and specification of the security algorithm or mode.

The AAA security association field 714 allows selection of a shared key, a password entered from a login screen, or a secure ID.

In addition, a home network settings field 716 allows entry of the netmask address, default gateway address and DNS server address.

Controls 718 and 720 are provided for setting up a VPN and an 802.11 interface, respectively.

Figure 8:
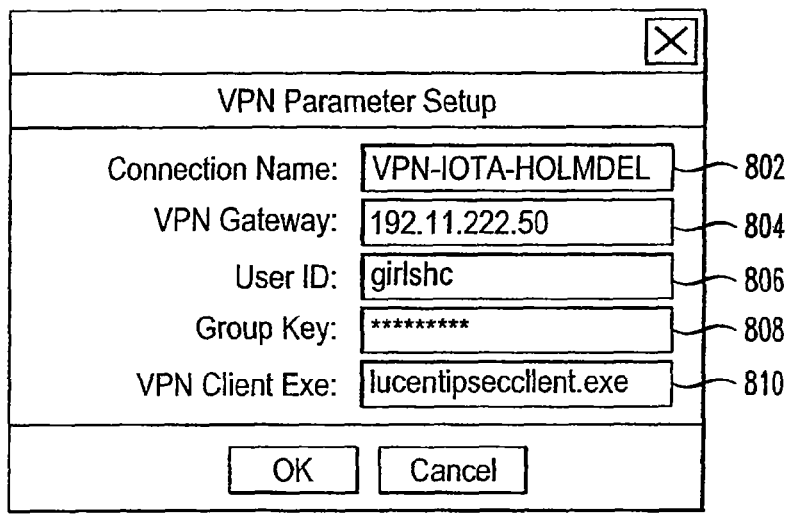
FIG. 8 is a diagram of a VPN parameter setup screen of the graphical user interface shown in FIG. 2.

FIG. 8 is a VPN parameter configuration screen 800 displayed in response to clicking the button 718 of screen 700. Screen 800 includes input fields for the connection name 802, VPN Gateway 804, User ID 806, group key 808 and VPN client executable file 810.

Figure 9:
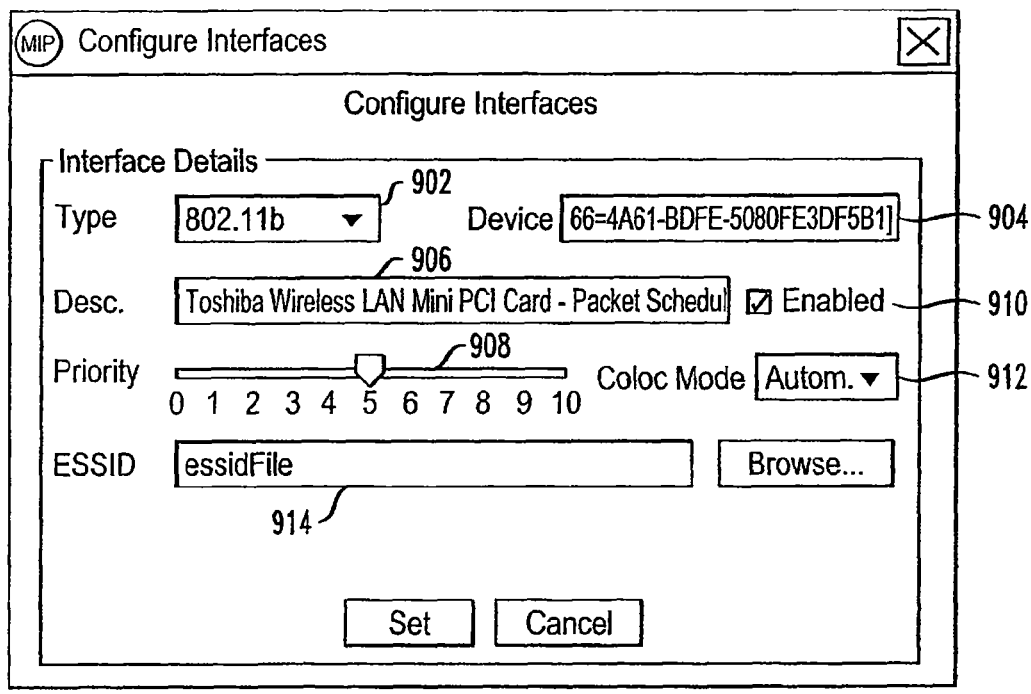
FIG. 9 is a diagram of an interface configuration screen of the graphical user interface shown in FIG. 2.

FIG. 9 shows an interface setup screen 900 displayed in response to clicking the button 720 of screen 700. Screen 900 includes fields to input interface type 902, device ID 904, a description 906, the user defined priority 908, a checkbox 910 to enable the interface, a control 912 for selecting collocated mode, and the ESSID 914.

Figures 10, 11:
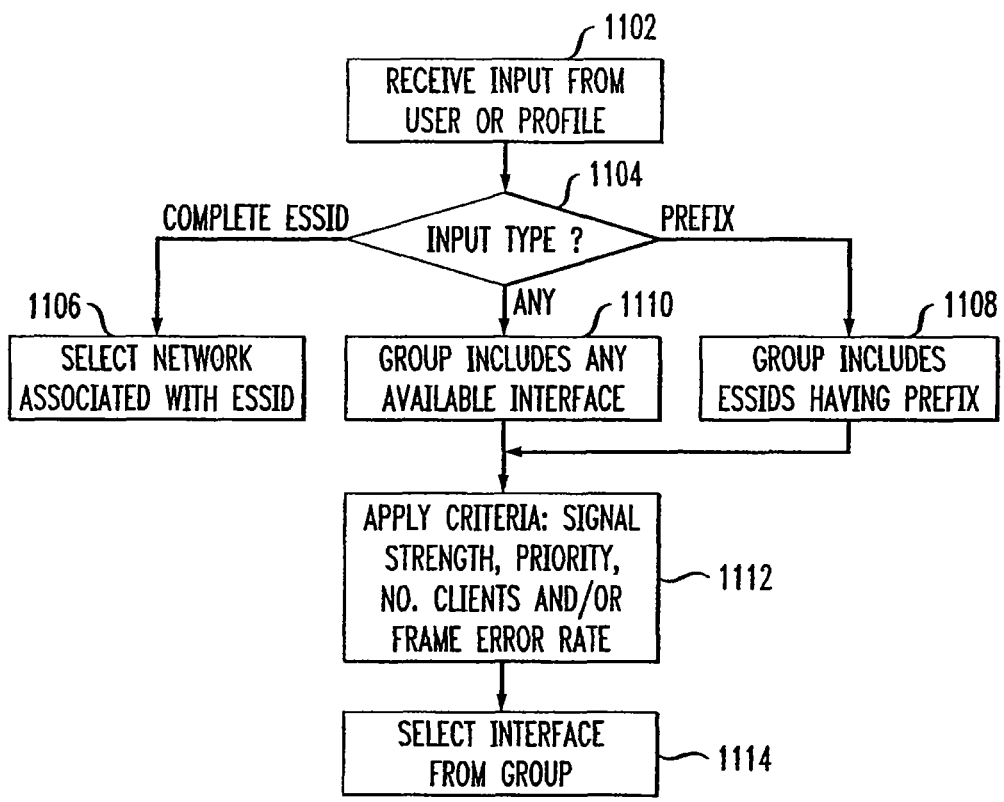
FIG. 10 is a diagram of an ESSID configuration screen of the graphical user interface shown in FIG. 2.
FIG. 11 is a flow chart of a variation of the interface selection method.

FIG. 10 shows an ESSID configuration screen 1000 that is displayed in response to clicking the "browse" button adjacent to ESSID field 914 of FIG. 9. The configuration screen 1000 allows the user to input parameters for each ESSID, including respective columns for ESSID 1002, WEP key 1004, key index 1006, threshold 1008 and priority 1010. Using screen 1000, the user is able to enter different threshold or priority values for different 802.11 APs. This allows the user to give a preference to free or low cost APs.

Another aspect of the exemplary client is an 802.11 network selection facility. A roaming list with the names of multiple ESSID network names is configured on the client, indicating to the client the acceptable networks onto which the client can roam. This list could be entered either manually or through other means, such as automatic download from a network server or from a file download mechanisms such as ftp. The roaming list may contain a combination of full ESSID network names and/or ESSID name prefixes (such as lucent*, where * is a wildcard character indicating any trailing characters are acceptable).

When the client is not associated with an access point, or if the signal strength from the current associated access point falls below a certain level, it will search for other available access points in the area. It will match the available ESSIDs seen from those access points in the area to those in the roaming list. The matching will either be the full ESSID name or a prefix ESSID match if a particular entry in the roaming list has the prefix syntax (string*). If there are several ESSID matches, one will be chosen whose signal strength is above a tunable or configured threshold. If all are above or below the threshold then the higher priority ESSID as indicated in the roaming list will be selected.

In other embodiments, other selection criteria (e.g., number of clients in each Wi-Fi network, and frame error rate in each Wi-Fi network) may be employed for the automatic selection. One of ordinary skill can readily design composite criteria that take into account two or more of the selection criteria.

FIG. 11 is a flow chart of a method for selecting a Wi-Fi network from a plurality of Wi-Fi networks, where each Wi-Fi network has an associated ESSID. An ESSID is a string with no special format as configured in an 802.11 access point.

At step 1102, the system receives an input indicating a selection of a complete ESSID, an ESSID prefix, or a request for any available Wi-Fi network. In some embodiments, the client displays to the user a list which may contain a list of complete ESSIDs, ESSID prefixes, and/or the option, "Any."

The user makes a selection from this list to provide the input. The client can see multiple ESSIDs from different 802.11 networks as well as seeing a 3G network. It will use the ESSID preferred roaming list to help select an 802.11 network. The preferred roaming list may have many ESSID's. In any one location there could be many different ESSID/networks seen by the client.

In other embodiments, the input is obtained directly from a user profile. The user need not be aware that the information is obtained from the profile.

At step 1104, the next action taken depends on whether the input represents a complete ESSID, an ESSID prefix, or a request for any available Wi-Fi network.

At step 1106, if a complete ESSID is entered, then the network associated with that complete ESSID is automatically selected.

At step 1108, if the user selects an ESSID prefix, then any Wi-Fi network having an ESSID that begins with that prefix is included in a group of candidate networks from which one network is automatically selected. The prefix option allows a convention to be used so that owners of different networks could be distinguished without having every single ESSID listed in the user profile's roaming list. All networks having the same owner could have ESSIDs that begin with the same prefix.

At step 1110, if the user selects, "Any," then all available Wi-Fi networks are included in the group of candidate networks from which one network is automatically selected.

At step 1112, the automatic selecting step is based on at least one criterion from the group consisting of: signal strength in each Wi-Fi network, priority of each Wi-Fi network, number of clients in each Wi-Fi network, and frame error rate in each Wi-Fi network, if the input indicates selection of the ESSID prefix or any available Wi-Fi network.

At step 1114, the system automatically selects one of the candidate Wi-Fi networks based on the at least one criterion applied in step 1112.

The selection steps 1106 and 1114 are invoked by the client under proper conditions and could be a 3G to 802.11 switch or a 802.11 to 802.11 switch, where the client switches between two 802.11 networks.

Although a preferred system gives the client/user a choice among selecting a complete ESSID, and ESSID prefix or "Any," some embodiments may only allow any one of these three selection methods or two out of the three of these three selection methods.

The 802.11 network selection component within the overall automated selection algorithm that is advantageous. Although there can be a single physical interface on the client for the 802.11 interface, the single physical interface is treated as multiple "logical" networks to chose from within that one interface. The network selection algorithm selects from all physical interfaces on the client (e.g., 802.11, ethernet, 3G1X, 1xEV-DO, UMTS, GPRS) along with the logical network selection in the 802.11 interface.

The exemplary client allows IPSec tunneling independent of mobility; i.e., an Ipsec tunnel that is established in one network continues to operate after moving to another network.

Although an exemplary multi-interface client is described above having at least one wireless interface, in other embodiments, the multi-interface client may have a plurality of wired interfaces, such as Ethernet and USB, for example, without a wireless interface. In such embodiments, the method and apparatus described above may be used to select one of the wired interfaces, and seamlessly change interfaces without interrupting an existing upper layer connection or session.

The exemplary multi-interface mobile node may be implemented with any combination of hardware and software. The mobility client 106 and associated driver 130 can be included in an article of manufacture (e.g., one or more computer program products, having, for instance, computer usable media). The medium has embodied therein, for instance, computer readable program code. The articles of manufacture can be included as part of a computer system or sold separately.

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, hard drives, ZIP™ disks, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method of operating a mobile node having an IPSec layer, comprising the steps of:
    establishing an IPSec session between the mobile node and a virtual private network/IPSec gateway by way of a first network;
    switching from the first network to a second network without disturbing the IPSec session, the switching being effected using mobile IP at a lower layer than the IPSec layer; and
    hiding the switching from the IPSec layer by providing a fake MAC layer address of a default router to the IPSec layer, and rewriting MAC layer headers in incoming and outgoing packets in an intermediate driver with correct MAC layer addresses.

2. The method of claim 1, further comprising:
    receiving a plurality of characteristics for a plurality of network interfaces, the plurality of network interfaces including a first network interface for communication by the mobile node via the first network and a second network interface for communication by the mobile node via the second network; and
    selecting the second network interface based on the plurality of characteristics.

3. The method of claim 2, wherein the plurality of characteristics comprises a plurality of signal strength values for the respective plurality of network interfaces.

4. The method of claim 2, wherein the plurality of characteristics comprises a plurality of signal strength values for the respective plurality of network interfaces and a plurality of user priority values for the respective plurality of network interfaces, wherein selecting the second network interface based on the plurality of characteristics comprises:
computing a plurality of scores for the respective plurality of network interfaces based on the plurality of signal strength values for the respective plurality of network interfaces and the plurality of user priority values for the respective plurality of network interfaces; and
selecting the second network interface based on the scores for the respective plurality of network interfaces.

5. The method of claim 4, wherein, for at least one of the network interfaces, computing the score for the respective network interface comprises comparing the signal strength value for the network interface to a signal strength threshold.

6. The method of claim 4, wherein, for at least one of the network interfaces, computing the score for the respective network interface comprises applying a weight coefficient to the user priority value for the network interface based on the signal strength value for the network interface.

7. A mobile node, comprising:
a network layer;
an IPSec driver below the network layer;
an intermediate driver below the IPSec driver;
at least one network interface to and from which the intermediate driver sends and receives packets;
wherein the intermediate driver is configured for switching from a first network to a second network, without disturbing an ongoing IPSec session, the switching being effected using mobile IP at a lower layer than the IPSec layer; and
wherein the intermediate driver is configured for hiding the switching from the IPSec layer by providing a fake MAC layer address of a default router to the IPSec layer, and rewriting MAC layer headers in incoming and outgoing packets with correct MAC layer addresses.

8. The mobile node of claim 7, wherein the at least one network interface comprises a plurality of network interfaces including a first network interface configured for communication by the mobile node via the first network and a second network interface configured for communication by the mobile node via the second network.

9. The mobile node of claim 8, further comprising:
a network selection block above the network layer, the network selection block configured to select the second network interface.

10. The mobile node of claim 9, wherein the network selection block is configured to:
receive a plurality of characteristics for the plurality of network interfaces; and
select the second network interface based on the plurality of characteristics.

11. The mobile node of claim 10, wherein the plurality of characteristics comprises a plurality of signal strength values for the respective plurality of network interfaces.

12. The mobile node of claim 10, wherein the plurality of characteristics comprises a plurality of signal strength values for the respective plurality of network interfaces and a plurality of user priority values for the respective plurality of network interfaces, wherein the network selection block is configured to select the second network interface based on the plurality of characteristics by:
computing a plurality of scores for the respective plurality of network interfaces based on the plurality of signal strength values for the respective plurality of network interfaces and the plurality of user priority values for the respective plurality of network interfaces; and
selecting the second network interface based on the scores for the respective plurality of network interfaces.

13. The mobile node of claim 12, wherein the network selection block is configured to, for at least one of the network interfaces, compute the score for the respective network interface by comparing the signal strength value for the network interface to a signal strength threshold.

14. The mobile node of claim 12, wherein the network selection block is configured to, for at least one of the network interfaces, compute the score for the respective network interface by applying a weight coefficient to the user priority value for the network interface based on the signal strength value for the network interface.

15. A non-transitory computer readable storage medium having stored thereon instructions which, when executed by a processor, cause the processor to perform a method of operating a mobile node having an IPSec layer, the method comprising the steps of:
establishing an IPSec session between the mobile node and a virtual private network/IPSec gateway by way of a first network;
switching from the first network to a second network without disturbing the IPSec session, the switching being effected using mobile IP at a lower layer than the IPSec layer; and
hiding the switching from the IPSec layer by providing a fake MAC layer address of a default router to the IPSec layer, and rewriting MAC layer headers in incoming and outgoing packets in an intermediate driver with correct MAC layer addresses.

16. The non-transitory computer readable storage medium of claim 15, the method further comprising:
receiving a plurality of characteristics for a plurality of network interfaces, the plurality of network interfaces including a first network interface for communication by the mobile node via the first network and a second network interface for communication by the mobile node via the second network; and
selecting the second network interface based on the plurality of characteristics.

17. The non-transitory computer readable storage medium of claim 16, wherein the plurality of characteristics comprises a plurality of signal strength values for the respective plurality of network interfaces.

18. The non-transitory computer readable storage medium of claim 16, wherein the plurality of characteristics comprises a plurality of signal strength values for the respective plurality of network interfaces and a plurality of user priority values for the respective plurality of network interfaces, wherein selecting the second network interface based on the plurality of characteristics comprises:
computing a plurality of scores for the respective plurality of network interfaces based on the plurality of signal strength values for the respective plurality of network interfaces and the plurality of user priority values for the respective plurality of network interfaces; and
selecting the second network interface based on the scores for the respective plurality of network interfaces.

19. The non-transitory computer readable storage medium of claim 18, wherein, for at least one of the network interfaces, computing the score for the respective network interface comprises comparing the signal strength value for the network interface to a signal strength threshold.

20. The non-transitory computer readable storage medium of claim 18, wherein, for at least one of the network interfaces, computing the score for the respective network interface comprises applying a weight coefficient to the user priority value for the network interface based on the signal strength value for the network interface.

* * * * *